INVENTOR.
Kurt Enslein
BY
J. L. Bowes
Attorney

INVENTOR.
Kurt Enslein
BY T. L. Bowes
Attorney

Patented Aug. 11, 1953 2,648,724

UNITED STATES PATENT OFFICE 2,648,724

METHOD AND APPARATUS FOR VISUAL ALIGNMENT OF TELEVISION RECEIVERS

Kurt Enslein, Rochester, N. Y., assignor to Stromberg-Carlson Company, a corporation of New York Application April 14, 1951, Serial No. 221,032

4 Claims. (Cl. 178—7.5)

The present invention relates to television receivers, and, more particularly, to a method and apparatus for the visual alignment of the reproduced picture of a television receiver. Specifically, the present invention relates to a method and apparatus for correctly centering the picture on the face of the picture tube and adjusting the size and linearity of the reproduced image to obtain an undistorted picture.

In the manufacture of television receivers, it is customary to provide a test or alignment position at the end of the production line at which position various tests are made to check whether the receiver has been correctly wired, and whether the electrical circuits thereof are correctly aligned to receive and reproduce television pictures which are transmitted from stations of predetermined frequency. When the receiver chassis is finally assembled in its cabinet, it is then necessary to adjust certain of the controls of the receiver so as to center the reproduced image on the face of the cathode ray tube and to adjust the size and linearity of the picture so that it exactly fits the viewing opening in the receiver cabinet. These testing and alignment operations must necessarily be conducted in a minimum amount of time and with a minimum requirement of skill on the part of the person conducting the test if the receivers are to be marketed on a competitive basis. Furthermore, it is desirable to provide some means whereby a check may be made on the visual alignment of the receiver when it is finally assembled in the receiver cabinet so that the receivers are all of uniform picture quality and need not be adjusted further when taken to the home of the customer.

Accordingly, it is an object of the present invention to provide a new and improved method and apparatus for visual alignment of the television receiver picture which is suitable for use on a production line basis.

It is another object of the present invention to provide a new and improved method and apparatus for visual alignment of a television receiver picture to obtain the correct centering of the picture on the face of the picture tube and the correct size and linearity of the reproduced image.

It is a still further object of the present invention to provide a new and improved method and apparatus for visual alignment of the television receiver picture which may be employed by relatively unskilled personnel to adjust the centering, size and linearity of the image reproduced on the face of the picture tube on a production line basis.

Briefly, in accordance with one phase of the invention, a television receiver is visually aligned by connecting a test pattern source to the input terminals of the receiver so as to reproduce a test pattern image on the picture tube of the receiver, the test pattern of said source including an alignment circle. A transparent alignment mask having means thereon defining an alignment zone is positioned over the picture tube of the receiver, said zone indicating the permissible limits of ellipticity of a test figure reproduced by the receiver under test. The visual comparison is then made of the alignment zone and the reproduced alignment figure and the centering, size and linearity controls of the receiver are adjusted so that the reproduced alignment figure falls within the limits defined by said zone. In accordance with a further feature of the invention there is provided means for accurately registering the alignment mask with the viewing window of the receiver under test.

The invention, both as to its organization and method of operation, together with further objects and advantages thereof, will best be understood by reference to the following specification taken in connection with the accompanying drawings, in which.

Figure 1:
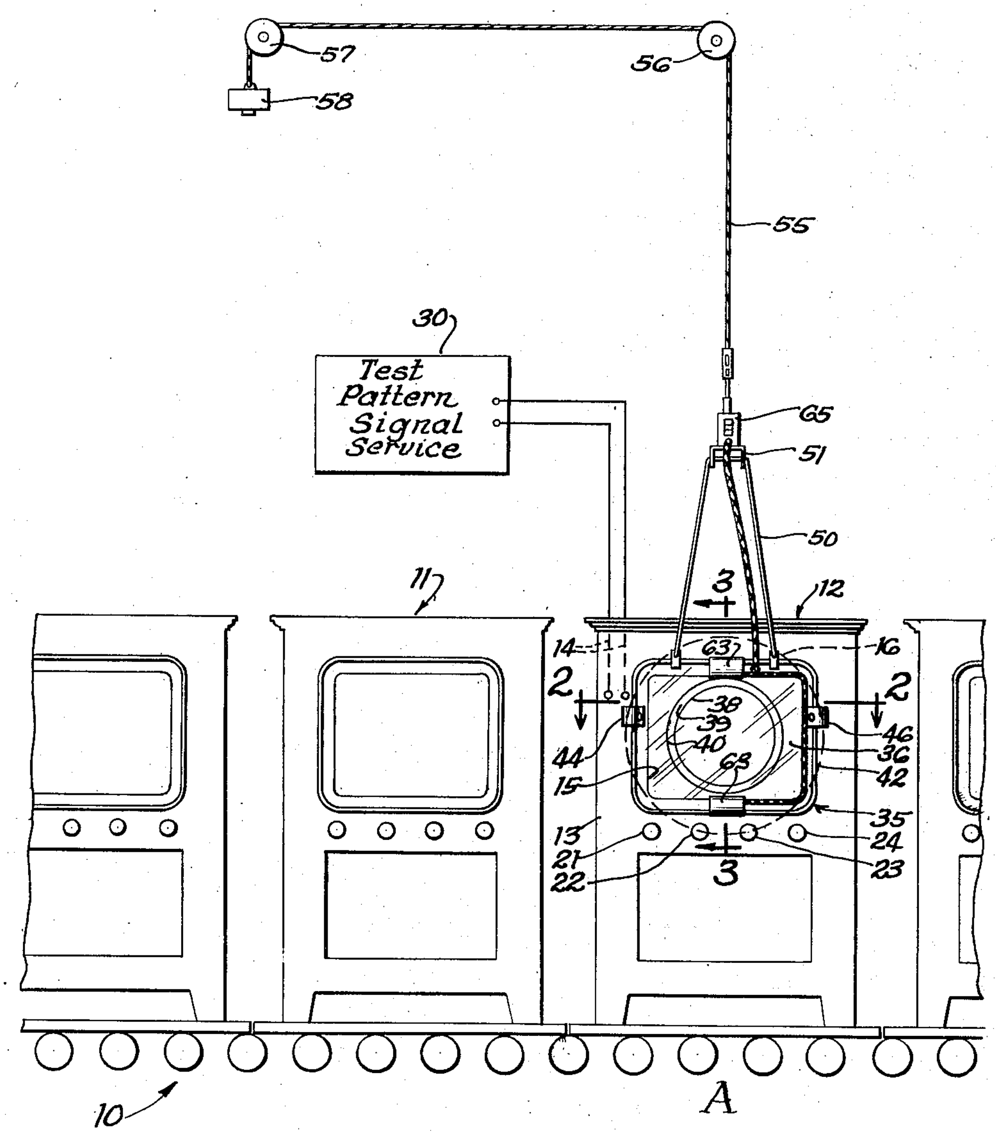
Fig. 1 is a front elevational view of an apparatus suitable for carrying out the method of the present invention shown in use with a television assembly line.
Figure 2:
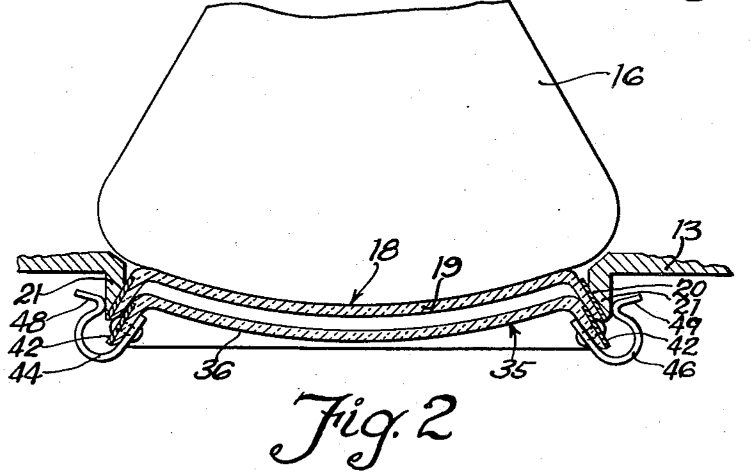
Fig. 2 is an enlarged sectional view taken along the line 2—2 of Fig. 1.
Figure 4:
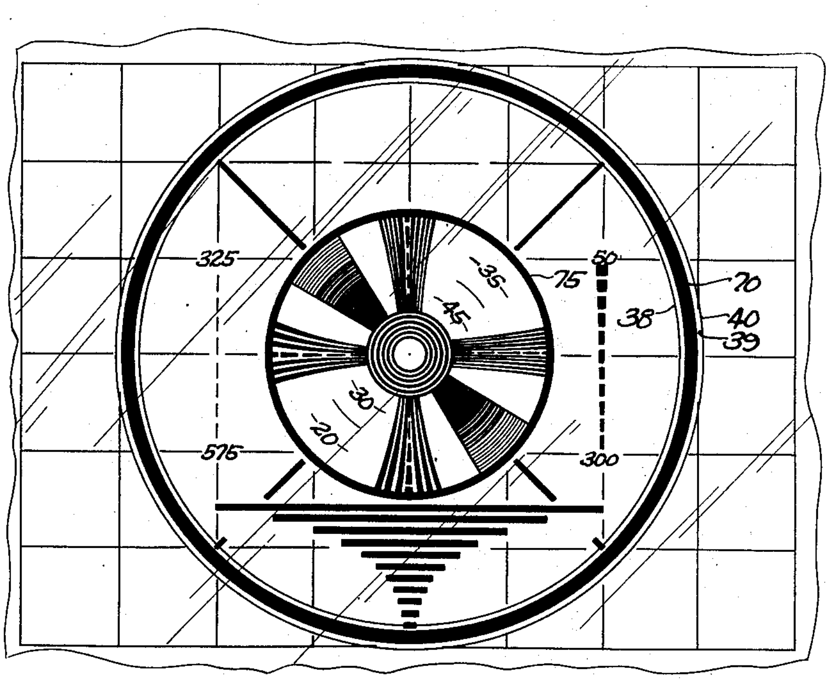
Fig. 4 is a front view of the viewing opening of a television receiver showing a typical test pattern and the visual alignment thereof in accordance with the present invention.

Referring now to the drawings and more particularly to Fig. 1 thereof, the present invention is illustrated in connection with a conventional television receiver production line which may comprise, for example, a conveyer mechanism indicated generally at 10, which may be of any suitable type, which is employed intermittently to convey completed television receivers 11, 12, etc., past the visual alignment station indicated generally at A. In general, the television receiver 12 comprises a cabinet 13 having a viewing window 15 through which the image which is reproduced on the face of the picture tube, indicated in dotted lines at 16, may be seen by the television viewers. As is best illustrated in Fig. 2, the window 15 is conventionally covered by means of a safety shield, indicated generally at 18, which protects the cathode ray tube from accidental damage and protects the viewers in case the cathode ray tube explodes. In the illustrated embodiment, the safety shield 18 comprises a curved transparent face plate 19 which is fused to a supporting rim 20 of metal. The rim 20 flares outwardly as shown and is secured by any suitable means to the corner molding 21 which outlines the viewing window 15. The rim 20 thus defines the portion of the picture tube face which is visible to the television viewer.

The receiver 12 further comprises the control knobs 21, 22, 23 and 24 which may include suitable controls for selecting the correct television channel, synchronizing the television picture and focusing and adjusting the brilliance and contrast of the reproduced image. These controls may also include suitable means for centering the picture relative to the face of the cathode ray tube and for adjusting the size and linearity of the picture; or, in the alternative, the controls for centering, size and linearity may be positioned on the back apron of the television chassis and accessible from the back of the television cabinet.

During manufacture and in accordance with the present invention, a test pattern from a test pattern signal source schematically designated at 30 is connected to the input or antenna terminals 14 of the television receiver 12 so as to produce on the face of the picture tube a static image commonly known as a monoscope pattern. Conventionally, the monoscope pattern includes an alignment figure, which is usually in the form of a circle, which covers a substantial area of the television picture and may be used as a guide in determining whether the receiver is aligned correctly. In this connection, it will be understood that the test pattern from the signal source 30 takes the place of the conventional picture from a commercial television transmitter station, and if the electrical circuits of the receiver are operating properly, a static image is reproduced on the face of the cathode ray tube.

In accordance with the present invention and in order to center the reproduced image so that it will be centrally positioned with respect to the viewing opening 15 and portions of the picture will not be lost behind the rim 20 of the shield 18, an alignment mask indicated generally at 35 is positioned over the viewing opening 15. The alignment mask is provided with a transparent face plate portion 36 which may be of glass, Lucite or other suitable transparent material, and there is inscribed or otherwise marked on the surface of the transparent portion 36 a pair of concentric circles 38 and 40. The concentric circles 38 and 40 define an annular alignment zone 39 which is indicative of the permissible limits of ellipticity of the alignment circle in the test pattern which is reproduced on the picture tube.

According to a feature of the invention there is provided means for accurately registering the alignment mask 35 with the viewing window 15. Thus, the alignment mask 35 is made substantially the same as the safety shield 18 so that these members can be nested together in the manner shown in detail in Fig. 2. The mask 35 includes a metal rim 42, similar to the rim 20 of the shield 18, to which is fused the inscribed transparent plate 36.

In order to secure the mask 35 in place over the viewing opening 15, there are provided the spring clip members 44 and 46 which are positioned at either side of the mask 35 and are provided with fingers 48 and 49 which engage the molding 21 when the alignment mask is in place. In this connection it will be understood that the feature of nesting the mask 35 within the shield 18 insures that the mask 35 is correctly registered with the viewing window, the clips 44 and 46 merely serving to hold the mask in place.

The concentric circles 38 and 40, which define the annular alignment zone 39, are so positioned on the transparent plate 36 that they appear in the center of the viewing opening 15 when the alignment mask 35 is clamped in place in the manner described above. The alignment mask 35 is preferably supported by means of an inverted U-shaped hanger 50 which is in turn pivotally supported by means of the bracket 51. The entire alignment mask assembly is supported by means of the cable 55 which extends over the pulleys 56 and 57 and is counterbalanced by the weight 58 so that the alignment mask 35 may be quickly and easily slipped into place over the viewing opening of successive television receivers as they are conveyed to the visual alignment station A.

In accordance with a further feature of the present invention, the transparent plate portion 36 of the alignment mask 35 is provided with edge lighting means which may comprise the light sources indicated generally at 60 and 62 (Fig. 3) which illuminate the inscribed concentric circles 38 and 40 so that these circles show up brightly on a dull background and define the boundaries of the annular alignment zone 39 to which the test pattern alignment circle is adjusted. The light sources 60 and 62 may be energized by any suitable means such as the transformer 65 which is carried atop the bracket member 51 and connected to a suitable source of alternating current. To divert light from the sources 60 and 62 longitudinally of the transparent plate 36, there are provided the opaque masking strips 63 and 64 which are positioned on opposite sides of the sources 60 and 62.

Considering now the operation of the present invention, the receiver undergoing alignment is conveyed to the station A at which time the test pattern signal source 30 is connected to the input terminals 14 of the receiver so as to produce a static image of the monoscope type on the picture tube of the receiver. Due to various factors, the reproduced test pattern may not be centered relative to the viewing opening 15 and furthermore the size and linearity of the reproduced image may be incorrect so that a distorted image is obtained.

In accordance with the present invention and using the alignment circle of the test pattern as a guide, the centering controls are manually adjusted so that the alignment circle of the reproduced test pattern is substantially concentric with the annular alignment zone 39. Next, the size and linearity controls are adjusted so that the alignment circle of the reproduced test pattern falls within the boundaries of the alignment zone 39. When this is accomplished, the reproduced image is correctly aligned within the permissible commercial tolerances of size and linearity.

While it is possible to adjust the centering, size and linearity controls of the television receiver by eye so that the monoscope test pattern appears correct to the observer, it has been found that such a procedure is costly and time consuming and does not result in uniformly aligned television receivers. However, by employing the above-described method and apparatus for visually aligning the television receiver, the receivers may be aligned on a mass production basis and a uniform product is assured.

Figure 3:
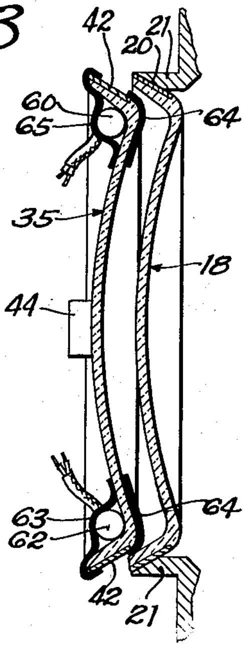
Fig. 3 is an enlarged sectional view taken along the line 3—3 of Fig. 1.

In Fig. 3 there is illustrated in greater detail a representative monoscope test pattern and the manner in which this test pattern is used in visually aligning a receiver by employing the principles of the present invention. Thus, the monoscope test pattern which is reproduced on the face of the picture tube may consist of a large annular ring or alignment circle 70 which is used as an alignment figure, a plurality of smaller rings 71, 72, 73 and 74 in the corners of the test pattern and a smaller circle 75 in the center of the test pattern. Inside the circles 71–75, inclusive, are five sets of resolution wedges which are calibrated so as to obtain the line resolution of the reproduced television image. When the alignment mask 35 of the present invention is placed over the viewing opening 15, the annular alignment zone 39 defined by the circles 38 and 40 is superimposed upon the alignment circle or figure 70 and the centering, size and linearity controls of the receiver are adjusted in the manner described above so that the alignment figure 70 falls within the limits of the annular alignment zone 39.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In an apparatus for successively aligning a plurality of television receivers for reproduction of a test pattern within predetermined limits, the combination of an alignment position; means for moving each of said television receivers in turn past said alignment position; a test pattern source adapted to be connected to the input terminals of a receiver, the test pattern of said source including an alignment circle to which a receiver is to be aligned; a transparent mask adapted to be placed over the picture window of a receiver, said mask having a pair of concentric circles thereon defining the permissible limits of said alignment circle when reproduced by a receiver under alignment; means movably supporting said mask at said alignment position; means for biasing said mask away from the picture window of a receiver at said aligning position, whereby said mask may be moved against said biasing means and placed against the picture window of a receiver in said alignment position; whereby the horizontal and vertical size and linearity controls of said receiver may be adjusted so that the reproduced test pattern lies within the space between said concentric circles on said mask.

2. In an apparatus for successively aligning a plurality of television receivers for reproduction of a test pattern within predetermined limits, the combination of an alignment position; means for moving each of said television receivers in turn past said alignment position; a test pattern source adapted to be connected to the input terminals of a receiver, the test pattern of said source including a test figure of predetermined configuration; a transparent mask adapted to be placed over the picture window of a receiver; means on said mask defining an alignment zone of a configuration substantially the same as said test figure, said alignment zone defining the permissible limits of a test figure reproduced on a receiver in said alignment position; means movably supporting said mask at said alignment position; means for biasing said mask away from the picture window of a receiver at said alignment position, whereby said mask may be moved against said biasing means placed against the picture window of a receiver in said alignment position, whereby the horizontal and vertical size and linearity controls of a receiver may be adjusted so that the test figure reproduced on a receiver lies within the alignment zone defined on said mask.

3. The combination of claim 1 to which is added means for illuminating said concentric circles on said mask.

4. The combination of claim 2 to which is added means for illuminating said test figure of predetermined configuration on said transparent mask.

KURT ENSLEIN.

References Cited in the file of this patent

UNITED STATES PATENTS

| Number | Name | Date |
|---|---|---|
| 2,251,984 | Cleaver et al. | Aug. 12, 1941 |
| 2,446,674 | Sproul | Aug. 10, 1948 |
| 2,540,110 | Gall | Feb. 6, 1951 |
| 2,570,738 | Wikkenhauser | Oct. 9, 1951 |